Feb. 21, 1967
R. H. DAVIS
3,304,854
FEED FORMING DEVICE
Filed Aug. 13, 1965
2 Sheets-Sheet 1
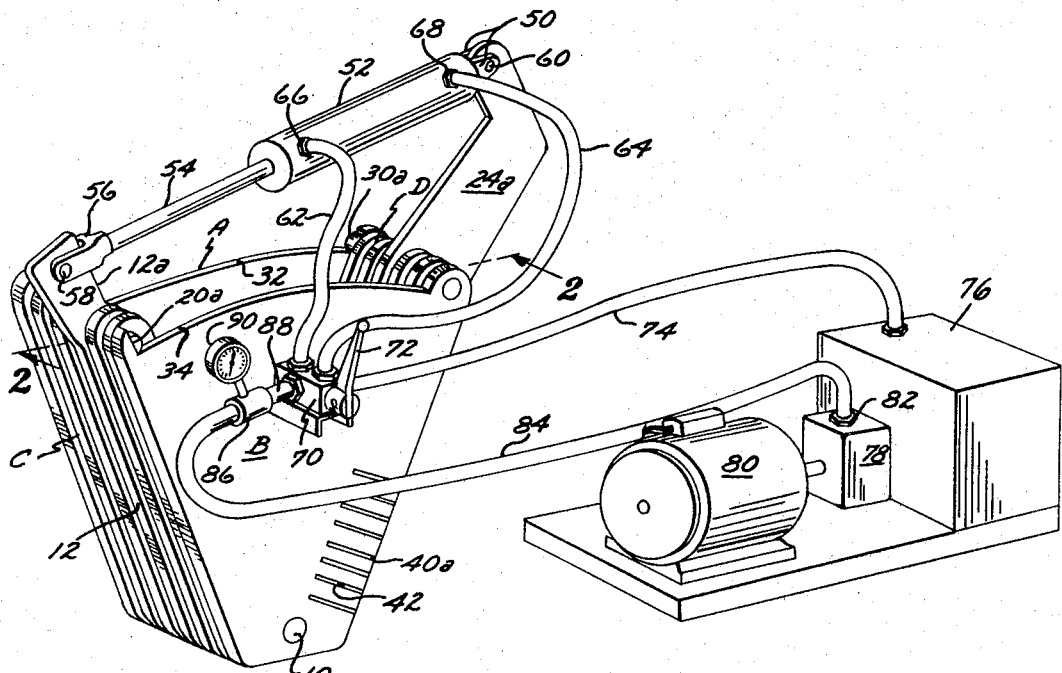
FIG. 1
FIG. 2
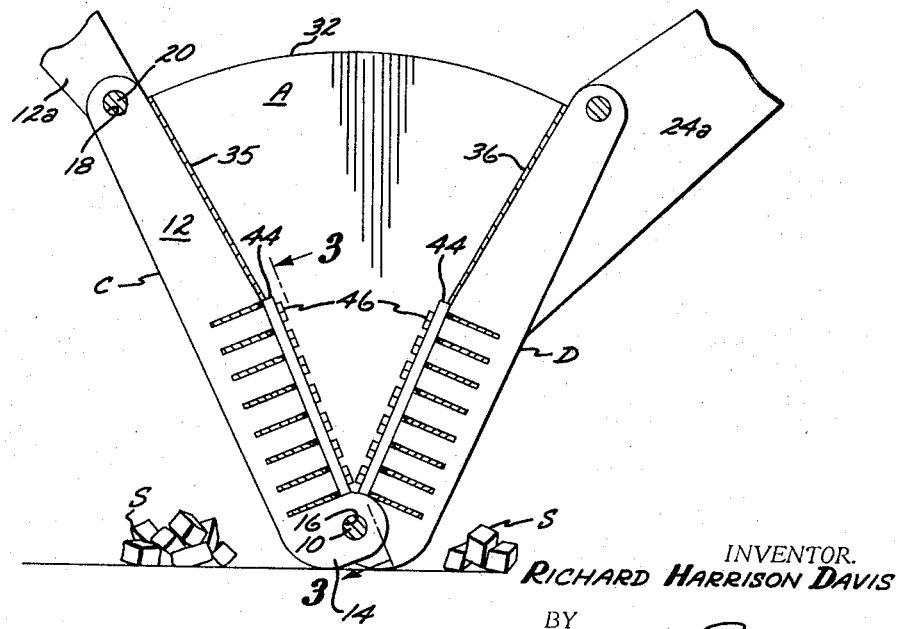
INVENTOR.
RICHARD HARRISON DAVIS
BY
William C. Babcock
ATTORNEY Feb. 21, 1967   R. H. DAVIS   3,304,854
FEED FORMING DEVICE
Filed Aug. 13, 1965   2 Sheets-Sheet 2
FIG. 3
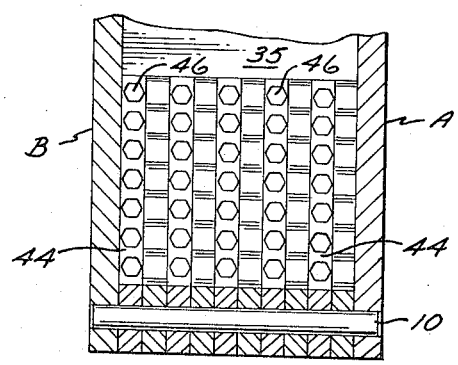
FIG. 6
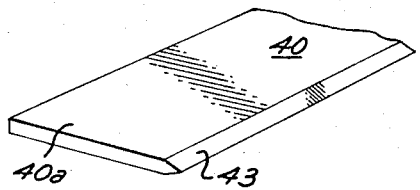
FIG. 4
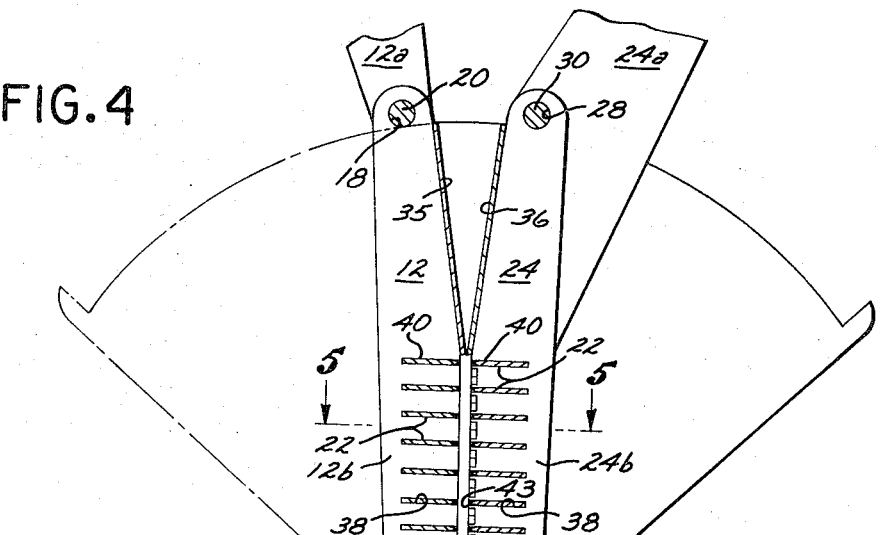
FIG. 5
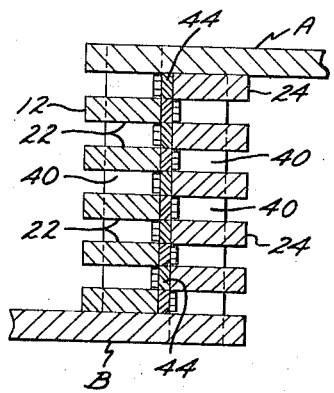
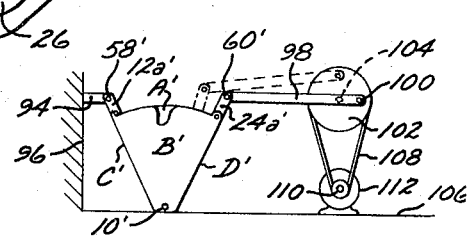
FIG. 7
INVENTOR.
RICHARD HARRISON DAVIS
BY
William C. Babcock
ATTORNEY United States Patent Office 3,304,854
Patented Feb. 21, 1967

3,304,854
FEED FORMING DEVICE
Richard Harrison Davis, Bakersfield, Calif., assignor of one-half to Earl A. Ernst and Martin Etcheverry, jointly, Bakersfield, Calif.
Filed Aug. 13, 1965, Ser. No. 479,507
7 Claims. (Cl. 100—98)

The present invention relates generally to the preparation of cattle feed, and more particularly to a device for transforming bulk feed such as alfalfa, or the like, into small bodies of a desired transverse shape and area.

In the feeding of cattle it has been found desirable to first transform such bulk material as alfalfa, or like grasses into small bodies that are preferably rectangular or cubic in shape.

A primary object of the present invention is to provide a power-driven device which may be used in carrying out the method for transforming bulk fodder into small bodies of a cubic or rectangular shape at a site adjacent to the feeding area to minimize the handling of the formed feed material.

Another object of the invention is to supply a device that can be fabricated from standard, commercially available materials which requires no elaborate plant facilities for the production thereof, whereby it can be retailed at a sufficiently low price as to encourage the widespread use thereof.

A still further object of the invention is to furnish a device of relatively simple mechanical structure that is easy to operate, and requires a minimum of maintenance attention.

Yet another object of the invention is to provide a device by means of which fodder such as alfalfa, or the like, can be transformed into small bodies of cubic or rectangular shape, just prior to the use thereof, and one that eliminates the necessity of storing the formed feed material.

These and other objects and advantages of the invention will become apparent from the following description of several forms thereof, and from the accompanying drawings illustrating the same, in which:

FIGURE 1 is a perspective view of a first form of the invention;

FIGURE 2 is a transverse cross-sectional view of the device, taken on the line 2—2 of FIGURE 1;

FIGURE 3 is a fragmentary front elevational view of a portion of the device, taken on the line 3—3 of FIGURE 2;

FIGURE 4 is the same vertical cross-sectional view shown in FIGURE 2, but with the movable portions of the device in adjacent disposition;

FIGURE 5 is a horizontal cross-sectional view of a portion of the device, taken on the line 5—5 of FIGURE 4;

FIGURE 6 is a perspective view of a portion of one of the cutting blades; and

FIGURE 7 is a side elevational view of a second form of the invention.

With continued reference to the drawings for the general arrangement of the first form of the invention, it will be seen to include first and second side walls A and B. A first end wall C is rigidly affixed to side wall A, and a second end wall D is secured to side wall B. The first and second side walls A and B are pivotally connected at their lower ends by a transversely extending rod 10.

Side walls A and B, and the end walls C and D, when disposed as shown in FIGURE 1, cooperatively define an open-topped hopper into which bulk feed, such as alfalfa, or the like, can be fed to be transformed into small bodies of cubic or rectangular shape, or bodies of other desired transverse cross-section, as will later be described. The first end wall C, as can best be seen in FIGURES 1, 2, 3, 4 and 5, includes a number of laterally spaced, upwardly extending bars 12, in the lower end portions 14 of which transverse bores 16 are formed that are pivotally engaged by rod 10. An extension 12a projects upwardly from one of the bars 12 and is used in moving the first end wall C and first side wall A, relative to the second end wall D and second side wall B.

Transversely aligned bores 18 are formed in the upper portion of bars 12 through which a rod 20 extends. The bars 12 cooperatively define elongate spaces 22 therebetween, as may be seen in FIGURE 5. The second end wall D (FIGURE 4) also includes a number of laterally spaced bars 24 in the lower portions 26 of which bores are formed that pivotally engage the rod 10. An upwardly projecting extension 24a on one of the bars 24 is used in pivoting the second end wall D and second side wall B relative to the first end wall C and first side wall A. Transverse bores 28 extend through the upper ends of the bars 24, that are engaged by a rod 30. The rod 10, together with the rods 20 and 30, serve to hold the first and second bars 12 and 24 respectively together to define the first and second end walls C and D.

The upper edge 32 of the first side wall A is curved, as is the upper edge 34 of the second side wall B. An end portion 20a projects from rod 20 that is in sliding contact with the edge 34. The rod 30, as can best be seen in FIGURE 1, likewise has a projecting portion 30a, that is in sliding contact with the edge 32. The rod portions 20a and 30a serve as guides, as the first and second side walls A and B and first and second end walls C and D are moved relative to one another during the transformation of the feed stock into small bodies of cubic or rectangular shape S, as shown in FIGURE 2.

The adjacent faces of the portions 12a and 24a of the first and second bars 12 and 24, respectively, taper upwardly and outwardly therefrom (FIGURE 4), and support two plates 35 and 36 to define a wedge-shaped space 37 therebetween when the first and second end walls C and D respectively, are disposed as shown in FIGURE 4.

A number of parallel, vertically spaced slots 38 are formed in the lower portions 12b and 24b of the first and second bars 12 and 24, respectively, in which cutting blades 40 of the shape shown in FIGURE 6, are mounted. The end portions 40a of blades 40 mounted in the second end wall D extend through vertically spaced slots 42 formed in the second side wall B (FIGURE 4). The first side wall A also has slots (not shown) formed therein, through which end portions 40a of the blades 40 project. The slots 42 (not shown) on the first side wall A occupy the same position as those of the second side wall B, as illustrated in FIGURE 1, but on the left-hand side of the first side wall A, rather than the right-hand side of the side wall B.

Each of the blades 40, as shown in FIGURE 6, is provided with a sharp cutting edge 43. A number of vertically extending rigid strips 44 are provided, that are of substantially the same width as the first and second bars 12 and 24, respectively, and these strips are secured to the adjacently disposed faces of the bars by bolts 46. Bolts 46 extend through openings (not shown) in the strips 44, to engage tapped recesses (not shown) in the adjacent faces of the first and second bars 12 and 24, respectively. The heads of the bolts 46 are so disposed relative to the blades 40, that the heads are situated in the spaces 22 between the blades 40, as can best be seen in FIGURES 4 and 5, when the first and second end walls C and D are in abutting contact. The strips 44 are of such width that they are disposed adjacent to the cutting edges 43 of the blades 40 when the first and second end walls C and D are pivoted to the position shown in FIGURES 4 and 5. Inward movement of the first and second end walls C and D, relative to one another is limited by the strips 44 which contact edges 43 of the blades 40, as can best be seen in FIGURES 4 and 5.

A hydraulic cylinder 52 is provided in which a piston (not shown) is slidably mounted that is connected to a piston rod 54. A bifurcated member 56 is rigidly affixed to the left-hand end of piston rod 54 (FIGURE 1). A pin 58 extends transversely through member 56 to engage a bore (not shown) formed in the first bar portion 12a. Two laterally spaced lugs 50 are affixed to the right-hand end portion of the hydraulic cylinder 52, as viewed in FIGURE 1, that extend on opposite sides of the bar portion 24a. A pin 60 extends transversely through the lugs 50 to engage a bore (not shown) formed in the bar portion 24a. Two flexible hoses 62 and 64 are, by conventional fittings 66 and 68 respectively, maintained in communication with interior end portions of the cylinder 52. The hoses 62 and 64 are connected to a manually operable three-position valve 70 that is actuated by a handle 72. A conduit 74 extends from valve 70 to a hydraulic fluid reservoir 76. The reservoir 76 is in communication with the suction of a pump 78, which is driven by a conventional electric motor 80.

The fluid discharge 82 of pump 78 is connected by a conduit 84 that extends to a T fitting 86, which by a second conduit 88, is connected to the valve 70. The T fitting 86 has a pressure gauge 90 connected thereto. When the handle 72 of the valve 70 is in a first position, fluid discharged from the pump 78 flows through the conduit 84, valve 70, and conduit 74 to return to the reservoir 76. Upon movement of handle 72 to a second position, fluid flows through the conduit 84 to valve 70, and from this valve to the conduit 62 to flow into the left-hand interior of the cylinder 52, as viewed in FIGURE 1. The fluid so entering the cylinder 52 moves the piston (not shown) therein in a direction to pivot the first and second end walls C and D respectively, towards one another to decrease the volume of the space 37 and initially compact the fodder disposed therein. When the handle 72 of valve 70 is moved to a third position, fluid is discharged from the pump 78 through the conduit 84 to the valve and then through conduit 64 to the right-hand interior of the hydraulic cylinder 52, to cause the piston (not shown) therein to move in a direction to pivot the first and second end walls C and D respectively, away from one another and increase the volume of the space 37.

As this operation proceeds, the alfalfa or other feed stock in space 37 that has, to a degree been compacted, drops downwardly between the blades 40 on the first and second end walls C and D by force of gravity, and by engagement of strips 44 is severed into short lengths that are forced into the spaces 22 as the valve handle 72 is moved to a second position to cause the first and second end walls C and D, together with the first and second side walls A and B, to move to the position shown in FIGURE 4. Handle 72 is alternately moved between the second and third positions to repeat this operation, whereby the fodder is alternately cut and forced into the confines of the passages 22 to be extruded therefrom as small bodies S (FIGURE 2) that are either cubic or rectangular.

It will be obvious that the device shown in FIGURE 1 may be located over a chute (not shown) or conveyor belt (likewise not shown) and the small formed feed S is deposited on the chute or conveyor belt for transfer to the feeding area or to storage. The valve 70 is of such structure that when fluid is discharged through conduits 62 or 64 to one of the interior end portions of cylinder 52, fluid in the cylinder discharges from the other of the conduits to the reservoir 76.

A second form of the device is shown in FIGURE 7, which has the same general structure as the first form thereof previously described, with the exception that in the second form the hydraulic actuating equipment is eliminated. Parts in the second form that are common to the first form previously described, are designated on the drawings by the same numerals and letters as previously used, but with a prime being added thereto. In the second bar portion 24a' which may be straight rather than side wall A' and first end wall C' remain stationary, with the second side wall B' and second end wall D' being pivoted relative thereto. The first bar portion 12a' is connected by a pin 58' or other suitable fastening means, to a bracket 94 that extends outwardly from a wall 96 or is otherwise held in a fixed elevated position. The second bar portion 24a' which may be straight rather than having the angular configuration as shown in FIGURE 1, is connected by a pin 60' to one end portion of a rigid member 98 that is pivotally connected by a pin 100 to the peripheral portion of a wheel 102 that is rotatably supported by a shaft 104 by conventional means at a desired elevation above the ground surface 106. The wheel 102 is driven by a belt 108 that extends to a driven pulley 110 that is rotated by an electric motor 112 or other suitable prime mover. When the motor 112 is electrically energized, the wheel 102 of course, is rotated, and the rigid member 98 reciprocated to pivot the second side wall B' and second end wall D' relative to the first side wall A' and first end wall C', with feed that is disposed within the confines of the alternate form of the device above described, being transformed into small bodies of rectangular or cubic shape S, in the same manner as described in connection with the first form of the device.

The use and operation of the first and second forms of the device has been described in detail, and need not be repeated.

Although the present invention is fully capable of achieving the objects and providing the advantages hereinbefore mentioned, it is to be understood that it is merely illustrative of the presently preferred embodiment thereof and I do not mean to be limited to the details of construction herein shown and described, other than as defined in the appended claims.

I claim:

1. A device for forming bulk fodder into a plurality of relatively small bodies having a transverse cross section of a desired shape and area, comprising:

(a) first and second end walls extending upwardly and outwardly from one another, the lower end portions of which are adjacently disposed, with the upper portions thereof defining a continuous surface, and with the lower portions of each of said end walls having a plurality of spaced passages extending therethrough;

(b) first and second parallel, laterally spaced side walls, said first side wall having an interior outer edge portion rigidly connected to said first end wall, with an interior outer edge portion of said second side wall being rigidly connected to said second end wall;

(c) first means for pivotally connecting at least the lower portions of said first and second end walls for providing an open-topped hopper defined by said first and second end walls and said first and second side walls, with said first end wall and first side wall being capable of moving as a unit relative to said second end wall and second side wall to vary the volume of space in said hopper; and (d) power means for intermittently pivoting at least said first end wall and first side wall in opposite directions relative to said second end wall and second side wall to alternately enlarge and reduce said space, with said bulk fodder when introduced into said hopper being initially compressed between said upper portions and then moving downwardly in said hopper space by force of gravity where it is further compressed and forced through said passages to be extruded therefrom as said small bodies.

2. A device as defined in claim 1, wherein said first and second end pieces are each defined by a plurality of first and second parallel, laterally spaced bars that are pivotally connected on their lower ends to said first means, with said first and second bars being disposed in different vertical planes, which device further includes:
 (e) first and second plates affixed to the upper interior edges of said first and second bars to define said continuous surfaces; and
 (f) a plurality of transversely extending, vertically spaced blades supported on said first and second bars that cooperate therewith to define said passages.

3. A device as defined in claim 2, wherein a plurality of transverse vertically spaced slots are formed in said first and second bars and extend outwardly from the adjacent edges thereof, which slots serve to removably support said blades in said bars.

4. A device as defined in claim 2 which further includes:
 (g) a plurality of parallel, vertically extending, laterally separated strips affixed to adjacent edges of said bars, which strips on said first and second bars inter-engage as said first end wall and side wall is moved relative to said second end wall and side wall to reduce said space therebetween, with said strips as they inter-engage cutting said bulk fodder therebetween into relatively short lengths and forcing the same outwardly through said passages.

5. A device as defined in claim 1, wherein upwardly projecting extensions are provided on each of said first and second end pieces, and said power means comprises:
 (e) a hydraulic cylinder;
 (f) a piston rod slidably mounted in said cylinder;
 (g) means for pivotally connecting an outer end of said piston rod to said first extension;
 (h) means for pivotally connecting the end of said cylinder opposite that from which said piston rod projects to said second extension; and
 (i) means for alternately discharging hydraulic fluid into opposite interior end portions of said cylinder to said cylinder to cause said first end wall and first side wall to pivot towards and away from said second end wall and second side wall.

6. A device as defined in claim 1, which further includes means for holding said first side wall and first end wall in a stationary position, and said power means for pivoting said second end wall and second side wall relative to first end wall and first side wall comprising:
 (e) an elongate rigid member pivotally connected to said second end wall; and
 (f) power means for imparting oscillatory movement to said rigid member.

7. A device as defined in claim 1, wherein the upper edges of said first and second side walls are of arcuate configuration, which device further includes:
 (e) first and second guides that project from said first and second end walls and slidably engage said edges as said first side wall and first end wall move relative to said second end wall and second side wall.

References Cited by the Examiner

UNITED STATES PATENTS

| 1,987,302 | 1/1935 | Majewski | 100—233 X |
| 2,186,415 | 1/1940 | Haworth | 107—8 |
| 2,373,057 | 4/1945 | Shinn | 100—233 |

FOREIGN PATENTS

| 465,304 | 9/1928 | Germany. |
| 551,574 | 6/1932 | Germany. |
| 553,315 | 12/1956 | Italy. |

BILLY J. WILHITE, *Primary Examiner.*